United States Patent

Cole et al.

Patent Number: 5,887,330
Date of Patent: Mar. 30, 1999

[54] CRIMPING TOOL

[75] Inventors: David Alexander Cole, Tewkesbury; Richard Mervyn Everett, Cheltenham, both of United Kingdom

[73] Assignee: Dowty Seals Limited, Gloucestershire, United Kingdom

[21] Appl. No.: 750,215

[22] PCT Filed: May 30, 1995

[86] PCT No.: PCT/GB95/01231

§ 371 Date: Nov. 27, 1996

§ 102(e) Date: Nov. 27, 1996

[87] PCT Pub. No.: WO95/32835

PCT Pub. Date: Dec. 7, 1995

[30] Foreign Application Priority Data

May 31, 1994 [GB] United Kingdom .................. 9410834

[51] Int. Cl.[6] .............. B23P 11/00; B23Q 3/00; F16K 15/00
[52] U.S. Cl. .................. 029/509; 29/888.04; 29/283.5; 277/9
[58] Field of Search ............... 29/888.044, 888.04, 29/509, 510, 511, 243.5, 243.58, 283.5; 277/1, 9

[56] References Cited

U.S. PATENT DOCUMENTS

| | | | |
|---|---|---|---|
| 2,792,625 | 5/1957 | Hoffman | 29/888.044 |
| 3,395,441 | 8/1968 | Herbenar | 29/441 |
| 3,793,699 | 2/1974 | Merola | 29/415 |
| 3,863,740 | 2/1975 | Kinman | 188/322 |
| 5,267,736 | 12/1993 | Pietsch et al. | 277/1 |
| 5,373,819 | 12/1994 | Linder | 29/888.04 |
| 5,419,032 | 5/1995 | Rytych | 29/511 |

FOREIGN PATENT DOCUMENTS

| | | |
|---|---|---|
| 705 003 | 3/1941 | Germany . |
| 2 226 609 | 12/1972 | Germany . |
| 26 07 334 | 8/1977 | Germany . |
| 32 48 197 | 6/1984 | Germany . |
| 34 19 182 | 11/1985 | Germany . |
| 1 365 551 | 9/1974 | United Kingdom . |

Primary Examiner—David P. Bryant
Assistant Examiner—Tisa Stewart
Attorney, Agent, or Firm—Marshall, O'Toole, Gerstein, Murray & Borun

[57] ABSTRACT

A pressing tool for fastening a seal 6 in a groove 5 of a support body is a rotatable holder 12 carrying ball rollers 22. A lip 4 forms a wall of the groove 5. The ball rollers are moved in a circular path along the lip 4 to press the lip 4 so as to grip the seal 6 in the groove 5.

17 Claims, 3 Drawing Sheets

CRIMPING TOOL

The present invention relates to seals and a method and apparatus for fastening a seal in place in a groove.

It is known to fasten an annular shaft seal to a support body by positioning an edge of the seal in a groove and then crimping a lip forming a wall of the groove so as to grip the edge of the seal. This crimping is undertaken using a die which moves laterally of the lip. This known crimping technique can result in cracking of the lip, which can lead to mechanical failure and leakage.

The present invention provides a method of fastening a seal in a groove in which a lip forming a wall of the groove is deformed so as to grip an edge of the seal in the groove, the lip being deformed by a pressing tool having at least one ball roller, said at least one ball roller moving along the length of the lip so that the centre line of said at least one ball roller parallel with the tool axis is offset from the lip to produced a chamfered pressed lip. The ball roller(s) can be moved relative to the lip, or vice versa.

The invention is especially applicable to an annular seal which is fitted into an annular groove in which case the ball roller is moved in a circular path. Preferably, a plurality of spaced-apart ball rollers are used which are located around said circular path.

The present invention also provides a pressing tool for fastening a seal in an annular groove in a support body, the tool comprising a rotatable holder carrying a plurality of ball rollers which run along a common circular path around the groove when the holder is rotated in contact with the support body, in which in use the ball rollers run around and deform a lip forming a wall of the groove so as to grip an edge of the seal, the pressing tool being applied in use so that the centre line of each said ball roller parallel with the tool axis is offset from the lip to produce a chamfered pressed lip. To effect the rotation, either the holder or the support body, or both, can be moved.

The ball rollers of the pressing tool are preferably spaced circumferentially around the periphery of a circular cross-section holder that is rotatable around its central longitudinal axis.

The ball rollers can be carried on the holder by legs which project from a front face of the holder. The legs may be biased to ensure good contact and relatively uniform pressure on the support body. The biasing can be spring-loading, electromagnetic or pneumatic loading, or loading using a gasfilled cavity.

The legs may include grease channels to the ball rollers for lubricating them. A grease channel in a spring-loaded leg may include a valve so that as the ball roller abuts and presses the support body against the force of the loading, grease is forced onto the ball roller. Thus lubrication of the ball rollers is effected automatically.

A preferred embodiment of the invention will now be described, by way of example, and with reference to the drawings, in which.

Figure 1:
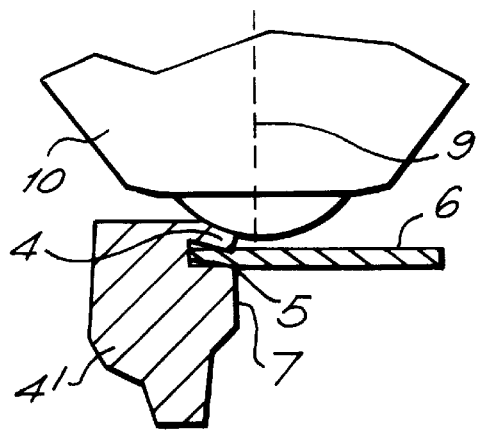
FIG. 1 is a diagrammatic cross-sectional view of a tool according to the present invention for securing an annular seal to a metal body so as to project radially inwards therefrom.
Figure 2:
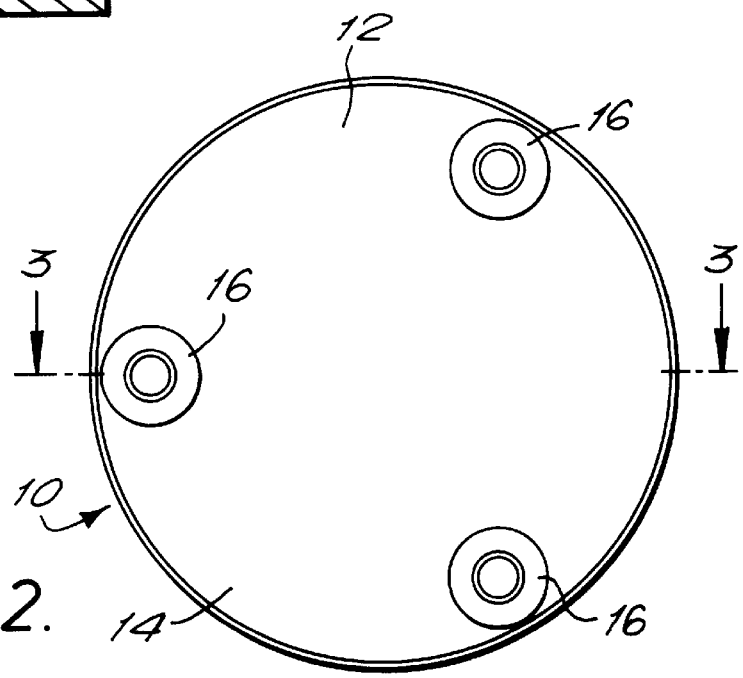
FIG. 2 is a front view of a first embodiment of a pressing tool according to the present invention.

As shown in FIG. 1, an annular shaft seal 6 is fastened to a support body 4' by inserting an edge of the seal 6 in a groove 5 in the support body 4' then crimping a lip 4 which forms a wall of the groove 5 so as to grip the edge of the seal 6. The crimping is performed by a ball roller 22 moving along the length of the lip 4 and groove 5. The point of engagement of the ball roller 22 with the lip 4 is offset to one side of the centre line 9 of the ball roller 22 parallel with the tool axis so as to produce a chamfered edge.

Figure 3:
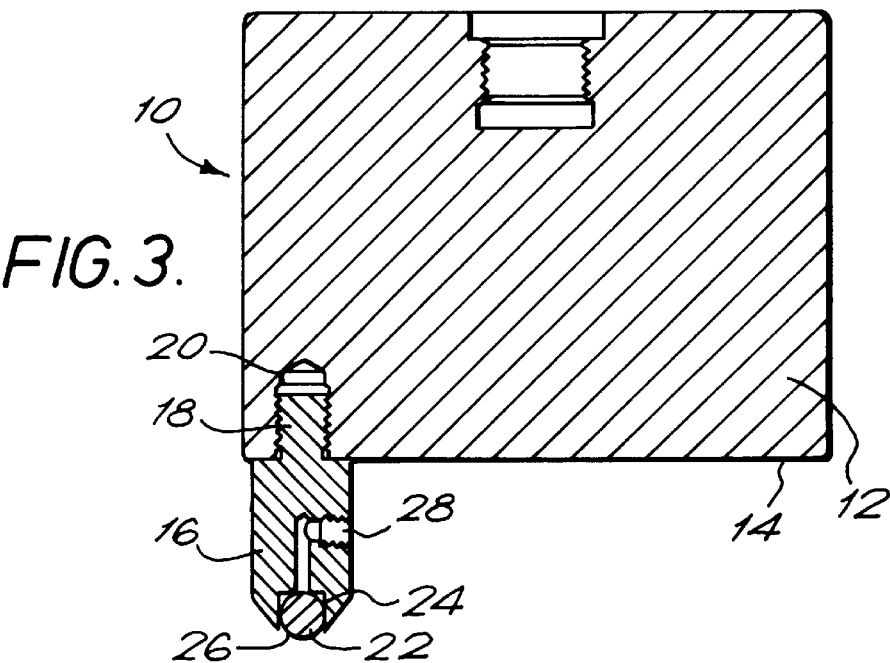
FIG. 3 is a sectional view along the line X—X shown in FIG. 2.
Figure 4:
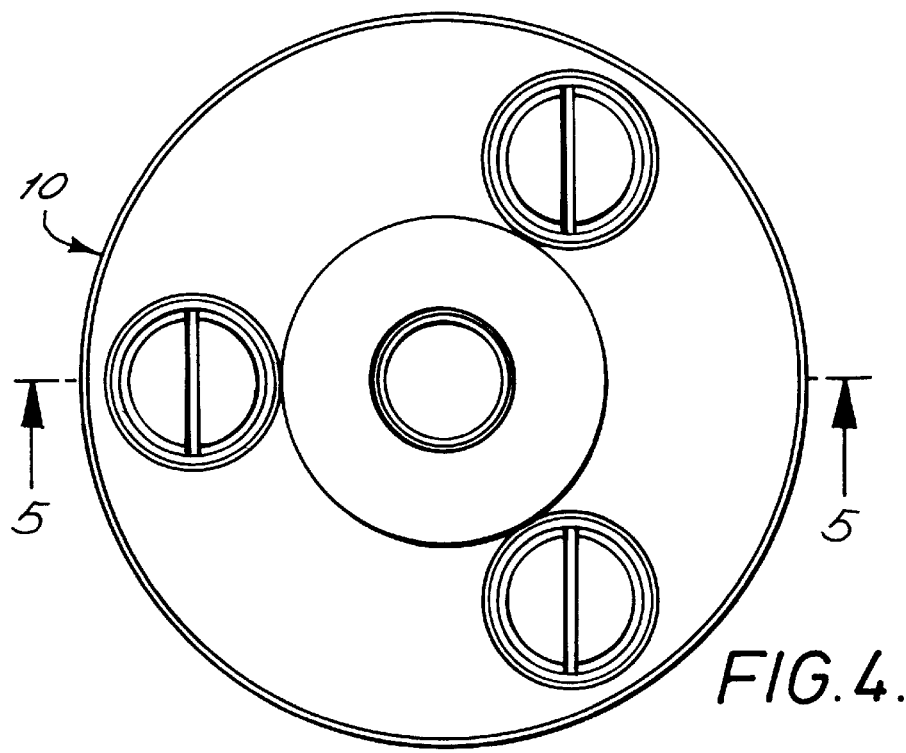
FIG. 4 is a front view of a second embodiment of a pressing tool according to the present invention.

In a first embodiment of the invention, as shown in FIGS. 3 and 4, pressing tool 10 consists of a cylindrical body 12 having a front face 14. Three legs 16 project from the front face 14. As shown in FIG. 3, each leg includes a threaded screw portion 18 which fits in a corresponding recess 20 in the front face 14 of the body 12. A ball roller 22 is held in an aperture 24 at the end of each leg 16 so as to be able to rotate within the aperture 24. Each ball roller 22 presents a partially exposed surface 26 for contact with the lip 4 in use. Each leg 16 includes a channel 28 for supplying grease to the respective ball roller 22 by way of the aperture 24.

The pressing tool 10 is used to fasten the seal 6 in the groove 5 by rotating the body 12 around its central longitudinal axis and moving the body 12 towards the lip 4 to be deformed. Each of the three ball rollers 22 then runs along the length of the lip 4 in a circular path about the axis of the groove 5. This results in the lip 4 being progressively deformed so as to grip the edge of the annular seal 6.

Figure 5:
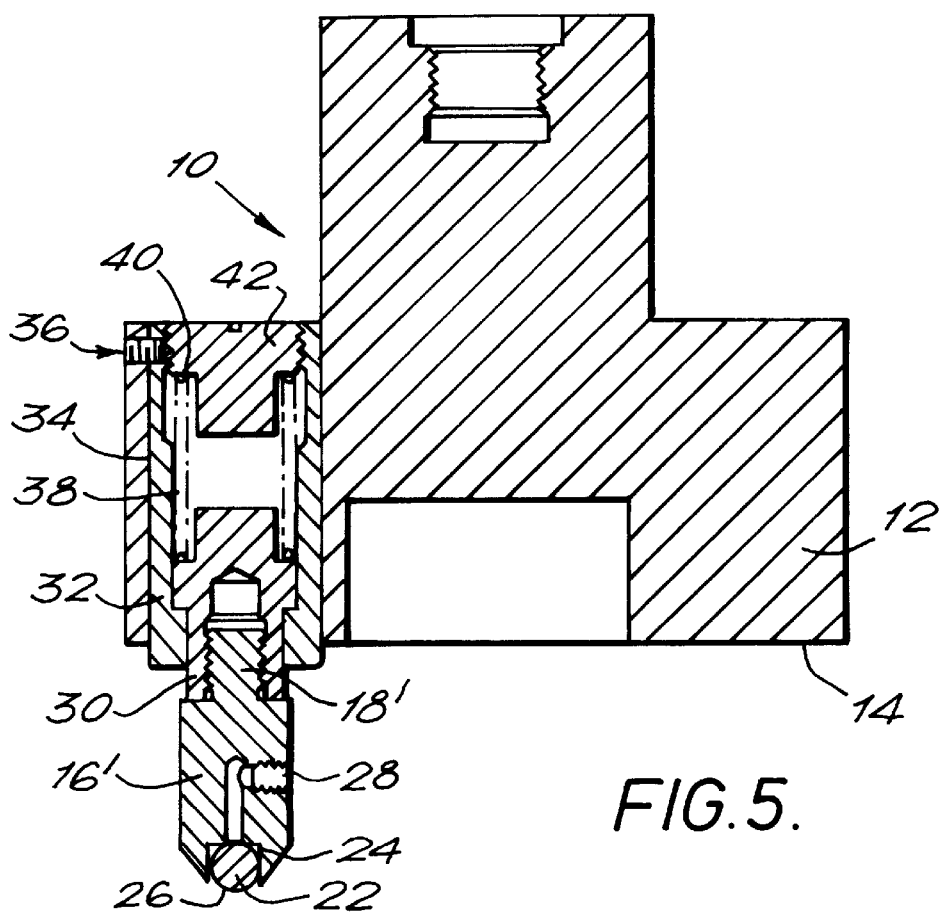
FIG. 5 is a cross-sectional view along the line X—X as shown in FIG. 4.

As shown in FIGS. 4 and 5, a pressing tool according to the second embodiment is basically similar to that of the first embodiment. Additionally, the legs 16 which carry the ball rollers 22 are spring-loaded to ensure good contact and even biasing against the lip 4 in use. The screw threaded portion 18' of the leg 16' fits into a recess in a moveable member 30 which is able to have limited axial movement within a housing 32. The housing 32 fits into a corresponding cavity 34 in the tool body 12 and is held there by a locking screw 36. The moveable member 30 is spring-loaded to project outwards by spring 38. The spring 38 abuts against a shoulder 40 of locking member 42.

Figure 6:
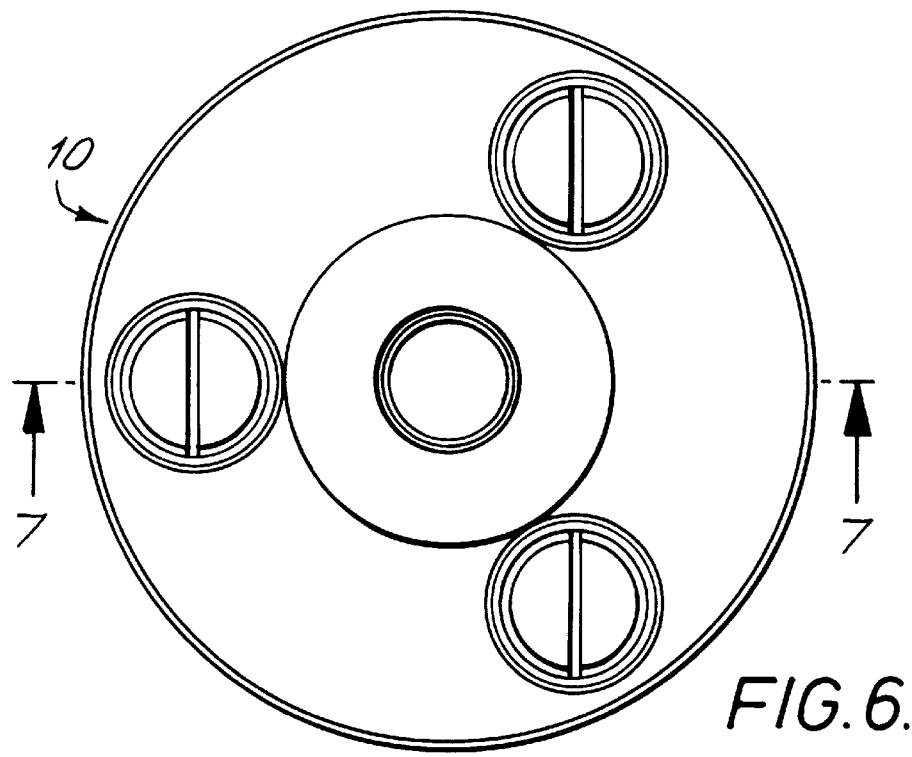
FIG. 6 is a front view of a third embodiment of a pressing tool according to the present invention.
Figure 7:
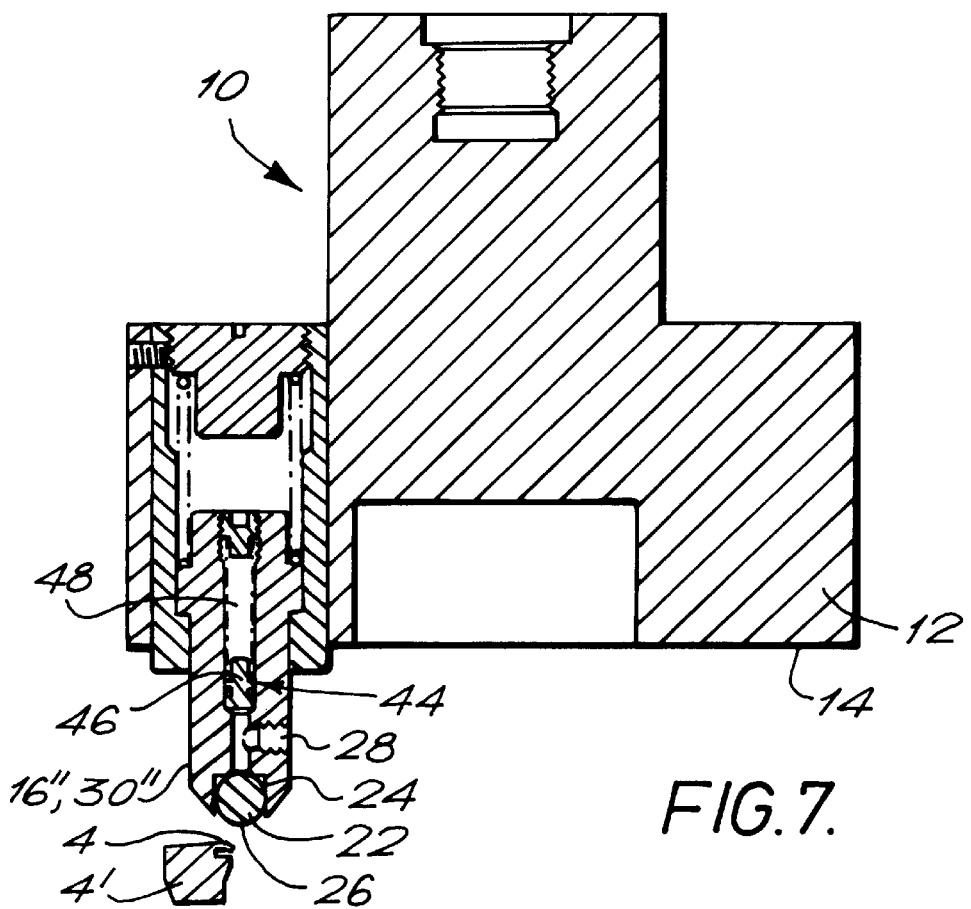
FIG. 7 is a cross-sectional view along the line X—X shown in FIG. 6.

As shown in FIGS. 6 and 7, the third embodiment of the invention is similar to the second embodiment but with a leg 16" and moveable member 30" formed of one piece and with valve means 44 including a spring loaded valve element 46 operative to force grease onto the ball roller 22 as the ball presses against the work piece 4'. Grease to be accommodated within the cavity 48 is provided via grease channel 28.

The present invention has advantages that a seal can be fastened without the need for prior heat treatment of the lip. The deformed lip is substantially free from cracks.

By selecting appropriate dimensions of components, such as ball roller(s), and applying appropriate axial movement of the tool, predetermined deformations can be produced. For each particular application, the size, configuration and degree of offset to the lip of ball roller(s) can be optimised. The degree of spring-loading can be selected as appropriate. Furthermore, the tool can be started rotating prior to axial movement and contact with the lip so as to ensure a uniform deformation occurs.

The invention thus enables lips to be deformed in an accurately controlled and uniform manner, even where lips have non-flat shapes and uneven surfaces.

It will be appreciated that whilst the drawings show a seal 6 extending radially inwards from a groove 5 in the inner circumferential edge of an annular body 4', the seal could equally well be secured to a groove in the outer circumferential edge of an annular body so as to extend radially outwards of the body.

We claim:

1. A method of fastening a seal in a groove of a support body, said groove being defined by a base portion of said support body and a circumferential lip of said support body, said method comprising:

inserting said seal in said groove of said support body;

providing a pressing tool comprising a tool axis and at least one ball roller, said at least one ball roller being mounted to extend outwardly from said pressing tool along a center axis which is parallel to said tool axis;

positioning said at least one ball roller against the lip so that the center axis of said at least one ball roller does not pass through the support body and is offset from the lip;

moving said at least one ball roller along the length of the lip to deform the lip into gripping engagement with an edge of the seal, thereby producing a chamfered pressed lip.

2. A method according to claim 1, in which the or each ball roller is moved relative to the lip.

3. A method according to claim 1, in which the lip is moved relative to the or each ball roller.

4. A method according to claim 1, in which the or each ball roller is moved in a circular path to deform the lip.

5. A method according to claim 4, in which a plurality of spaced-apart ball rollers (22) are located around said circular path.

6. A method according to claim 4, in which movement of said ball roller(s) around said circular path starts before axial movement to contact said ball roller(s) with the lip.

7. A pressing tool operative to fasten a seal in an annular groove in a support body, the tool comprising a holder rotatable about a central longitudinal axis and carrying a plurality of ball rollers, each ball roller extending outwardly from said holder along a center axis which is parallel to said central longitudinal axis, wherein said ball rollers run along a common circular path around the groove when the holder is rotated relative to and in contact with the support body to deform a lip of the groove so as to grip an edge of the seal, the pressing tool being applied in use so that the center axis of each said ball roller does not pass through the support body and is offset from the lip to produce a chamfered pressed lip.

8. A pressing tool according to claim 7, in which the holder is movable to effect the rotation.

9. A pressing tool according to claim 7, in which the support body is movable t o effect the rotation.

10. A pressing tool according to claim 7, in which both the holder and support body are movable to effect the rotation.

11. A pressing tool according to claim 7, which in use is started rotating prior to axial movement and contact with the support body.

12. A pressing tool according to claim 7, in which the ball rollers are spaced circumferentially around the periphery of the holder which is circular in cross-section and rotatable around its central longitudinal axis.

13. A pressing tool according to claim 7, in which the ball rollers are carried on legs that project from a front face of the holder.

14. A pressing tool according to claim 13, in which, in use, the legs are biased resiliently against the support body to provide relatively uniform pressure.

15. A pressing tool according to claim 14, in which the biasing is spring-loading, electromagnetic or pneumatic loading, or loading using a gas-filled cavity.

16. A pressing tool according to claim 13, in which the legs include channels to the ball rollers for providing grease for lubrication.

17. A pressing tool according to claim 16, in which a channel for grease includes a valve so that as the respective ball roller abuts and presses the support body against a loading force, grease is forced onto the ball roller.

* * * * *